United States Patent [19]
Shitanoki

[11] Patent Number: 5,360,956
[45] Date of Patent: Nov. 1, 1994

[54] ACCELERATION SENSOR FOR VEHICLE

[75] Inventor: Kazuaki Shitanoki, Wako, Japan

[73] Assignee: Honda Giken Kogyo Kabushiki Kaisha, Tokyo, Japan

[21] Appl. No.: 945,699

[22] Filed: Sep. 16, 1992

[30] Foreign Application Priority Data

Sep. 18, 1991 [JP] Japan .................... 238040

[51] Int. Cl.⁵ .................. H01N 35/14; H01N 1/12
[52] U.S. Cl. .................. 200/61.45 R; 200/503
[58] Field of Search .......... 200/61.45 R, 61.52, 200/52 R, 61.53; 73/503, 514

[56] References Cited

U.S. PATENT DOCUMENTS

| | | | |
|---|---|---|---|
| 3,617,669 | 11/1971 | Maloney | 200/153 R |
| 3,643,049 | 2/1972 | Lu Conic et al. | 200/153 R |
| 3,812,726 | 5/1974 | Bell | 73/503 |
| 5,178,264 | 1/1993 | Russell II | 200/503 |

Primary Examiner—A. D. Pellinen
Assistant Examiner—Michael A. Friedhofer
Attorney, Agent, or Firm—Armstrong, Westerman, Hattori, Mcleland & Naughton

[57] ABSTRACT

An acceleration sensor has a movable contact formed by a roll spring wound around a roller which can roll along a guide surface of a resinous frame, and stationary contacts mounted on the resinous frame to lie in a path of rolling movement of the roller. Two recesses are formed in the guide surface of the resinous frame and divided by a partition, and the stationary contacts are disposed in these recesses, respectively. The acceleration sensor ensures not only that the single movable contact be brought into contact with the two stationary contacts for conduction therebetween to thereby provide a function corresponding to two conventional acceleration sensors by a single acceleration sensor, but also that any dislocation of the two stationary contacts is restrained by the disposition thereof in the two recesses divided by the partition, thereby preventing short-circuit between both the stationary contacts.

6 Claims, 9 Drawing Sheets

ACCELERATION SENSOR FOR VEHICLE

BACKGROUND OF THE INVENTION

1. Field of the Invention

The present invention relates to an acceleration sensor for use in a vehicle and for outputting a signal indicative of a command to start a collision safety system such as an air bag system and a seat belt retracting system.

2. Description of the Prior Art

There is known a conventional acceleration sensor of the type described in Japanese Patent Publication No. 19282/82 which is used for outputting a signal indicative of a command to start an air bag system upon the collision of the vehicle. This acceleration sensor includes a resinous frame, a roller capable of rolling along a guide surface of the resinous frame, a roll spring wound around the roller to constitute a movable contact, and a stationary contact mounted on the resinous frame to lie in a path of a rolling movement of the roller. The roller is arranged to roll against a biasing force of the roll spring by an inertia due to a shock thereby, causing the stationary contact to be electrically connected with the movable contact.

In these days, there is a tendency that an air bag system for a vehicle is mounted not only for a driver's seat but also for an assistant driver's seat. However, the conventional acceleration sensor is provided with only a single contact and for this reason, there is a problem in that it is necessary to mount an acceleration sensor each for the driver's seat and the assistant driver's seat separately; thereby resulting in an increase in size of the system and an increase in cost. A monitor resistor is connected to the contact of the acceleration sensor, but it is necessary differentiate to the resistance value of the monitor between cases when the above-described conventional acceleration sensor is used exclusively for the driver's seat and when it is used for both the driver's seat and the assistant driver's seat. This causes a problem in that production and maintenance costs of the acceleration sensor increase.

In addition, the roll spring forming the movable contact of such a conventional acceleration sensor is locked at one end thereof to a roll spring retaining member supported on a support wall rising from the resinous frame. However, the roll spring retaining member is mounted in proximity to an inner surface of a casing covering an upper portion of the resinous frame and hence, if the roller spring retaining member and the casing, both made of an electrically conductive material, come into contact with each other for some reason, the movable contact is short-circuited to the casing, and an electric current which should be supplied to a squib escapes to the casing. Therefore, means for preventing this is required.

Further, the conventional acceleration sensor suffers from a problem in that a mounting bracket is mounted to a resinous casing covering a body of the sensor, and a harness is placed and potted in an opening in the resinous casing; thereby, resulting in an increase in the number of parts and an increase in contour size.

SUMMARY OF THE INVENTION

Accordingly, it is a first object of the present invention to provide an acceleration sensor for a vehicle which can be used either for a driver's seat only or for both seats of a driver and an assistant driver.

It is a second object of the present invention to provide an acceleration sensor for a vehicle, wherein the short-circuiting between the movable contact and the casing can be reliably prevented.

Further, it is a third object of the present invention to provide an acceleration sensor for a vehicle, wherein the fixing of the acceleration sensor to a mounting portion and the placing of a harness can be simultaneously performed.

In order to achieve the first object, according to the present invention, there is provided an acceleration sensor for a vehicle which includes a resinous frame, a roller capable of rolling along a guide surface of the resinous frame, a roll spring wound around the roller to form a movable contact, and stationary contacts mounted on the resinous frame to lie in a path of rolling movement of the roller so that the roller is rolled against a biasing force of the roll spring by an inertia due to a shock; thereby, causing the stationary contacts to be electrically connected with the movable contact, wherein the guide surface of the resinous frame is provided with two recesses divided by a partition, and the stationary contacts are disposed in the recesses, respectively.

With the above structural arrangement, the single movable contact mounted on the roller is brought into contact with the two stationary contacts mounted on the resinous frame for conduction therebetween. Therefore, when collision safety systems are mounted for both the driver's seat and the assistant driver's seat, the function corresponding to two conventional acceleration sensors can be provided by the single acceleration sensor, and reductions in space for placement and in production cost of the acceleration sensor can be achieved. If the two stationary contacts are interconnected and used as a single stationary contact, the acceleration sensor can be used for the collision safety system exclusively used for the driver's seat. Further, since the two stationary contacts are disposed in the two recesses which are divided by the partition, any dislocation of both the stationary contacts is restrained. Thus, not only is the short-circuiting between the stationary contacts reliably prevented, the roller spring to be supported on the partition also prevents any torsion of the roll spring, and the strength of the resinous frame is further increased by the functioning of the partition as a reinforcing rib.

In order to achieve the second object, according to the present invention, there is provided an acceleration sensor for a vehicle which includes a resinous frame, a roller capable of rolling along a guide surface of the resinous frame, a roll spring wound around the roller to form a movable contact, and stationary contacts mounted on the resinous frame to lie in a path of rolling movement of the roller so that the roller is rolled against a biasing force of the roll spring by an inertia due to a shock; thereby, causing the stationary contacts to be electrically connected with the movable contact. The sensor further includes an electrically conductive roll spring retaining member which stands at an edge of the resinous frame so as to retain one end of the roll spring, and an electrically conductive casing which covers an upper portion of the resinous frame, the roll spring retaining member being supported by a support wall integrally rising from the resinous frame, wherein at least a portion of the support wall is interposed between the roll spring retaining member and the casing.

With the above structural arrangement, since at least a portion of the support wall is interposed between the casing and the roll spring retaining member supported by the support wall which integrally rises from the resinous frame, it is possible to reliably avoid a disadvantageous condition whereby the roll spring retaining member and the casing, both made of an electrically conductive material, come into contact with each other resulting in the short-circuiting between the roll spring as the movable contact and the casing. Thus, the reliability of the acceleration sensor of this invention is substantially enhanced.

In order to achieve the third object, according to the present invention, there is provided an acceleration sensor for a vehicle which includes a sensor body a resinous frame, a roller capable of rolling along a guide surface of the resinous frame, a roll spring wound around the roller to form a movable contact, and stationary contacts mounted on the resinous frame to lie in a path of rolling movement of the roller so that the roller is rolled against a biasing force of the roll spring by an inertia due to a shock; thereby, causing the stationary contacts to be electrically connected with the movable contact. The sensor further includes a flange portion for fixing the sensor body to a mounting portion, and an annular partition formed integrally with the flange portion, a potting agent being filled into the inside portion of the partition to seal a base portion of a harness of lead wires which extend from the sensor body to the outside.

With the above structural arrangement, the flange portion and the partition are integrally formed on the acceleration sensor body, the acceleration sensor body being fixed to the mounting portion by the flange portion, and the potting agent being filled into the inside portion of the partition to seal the base portion of the harness. Therefore, the fixing of the acceleration sensor body and the potting of the harness can be achieved without bringing about an increase in the number of parts and an increase in size.

In this case, if a flexible potting agent is filled in the inside of the partition, and a cap detachably covering an opening in the partition and a harness holder for supporting the harness are mounted on a mounting member fixed inside the partition, not only is the short-circuiting of the harness prevented by the potting agent, a large amount of bending load is also prevented from acting on a boundary between the potting agent and the harness. Consequently, the durability of the harness can be substantially enhanced. Moreover, en exposed portion of the potting agent is covered with the detachable cap which leads to avoidance in disadvantageous conditions such as the injuring of the surface of the soft potting agent and the deposition of dusts on such surface. Additionally, the fixing of the cap and the harness holder can be achieved in a simple structure by the mounting member.

The above and other objects, features and advantages of the invention will become apparent from the following description of the preferred embodiment taken in conjunction with the accompanying drawings.

BRIEF DESCRIPTION OF THE DRAWINGS

FIGS. 1 to 9 illustrate a preferred embodiment of the present invention, wherein FIG. 1 is a perspective view of the entire acceleration sensor;

FIG. 2 is a side view of the entire acceleration sensor;

FIG. 3 is a sectional view taken along a line 3—3 in FIG. 2;

FIG. 4 is a sectional view taken along a line 4—4 in FIG. 2;

FIG. 5 is a sectional view taken along a line 5—5 in FIG. 2;

FIG. 6 is a sectional view taken along a line 6—6 in FIG. 3;

FIG. 7 is a sectional view taken along a line 7—7 in FIG. 5;

FIG. 8 is an exploded perspective view of a roller and a roll spring; and

FIG. 9 is a diagram of an electric circuit.

DESCRIPTION OF THE PREFERRED EMBODIMENTS

The present invention will now be described by way of a preferred embodiment in connection with the accompanying drawings.

Figure 1:
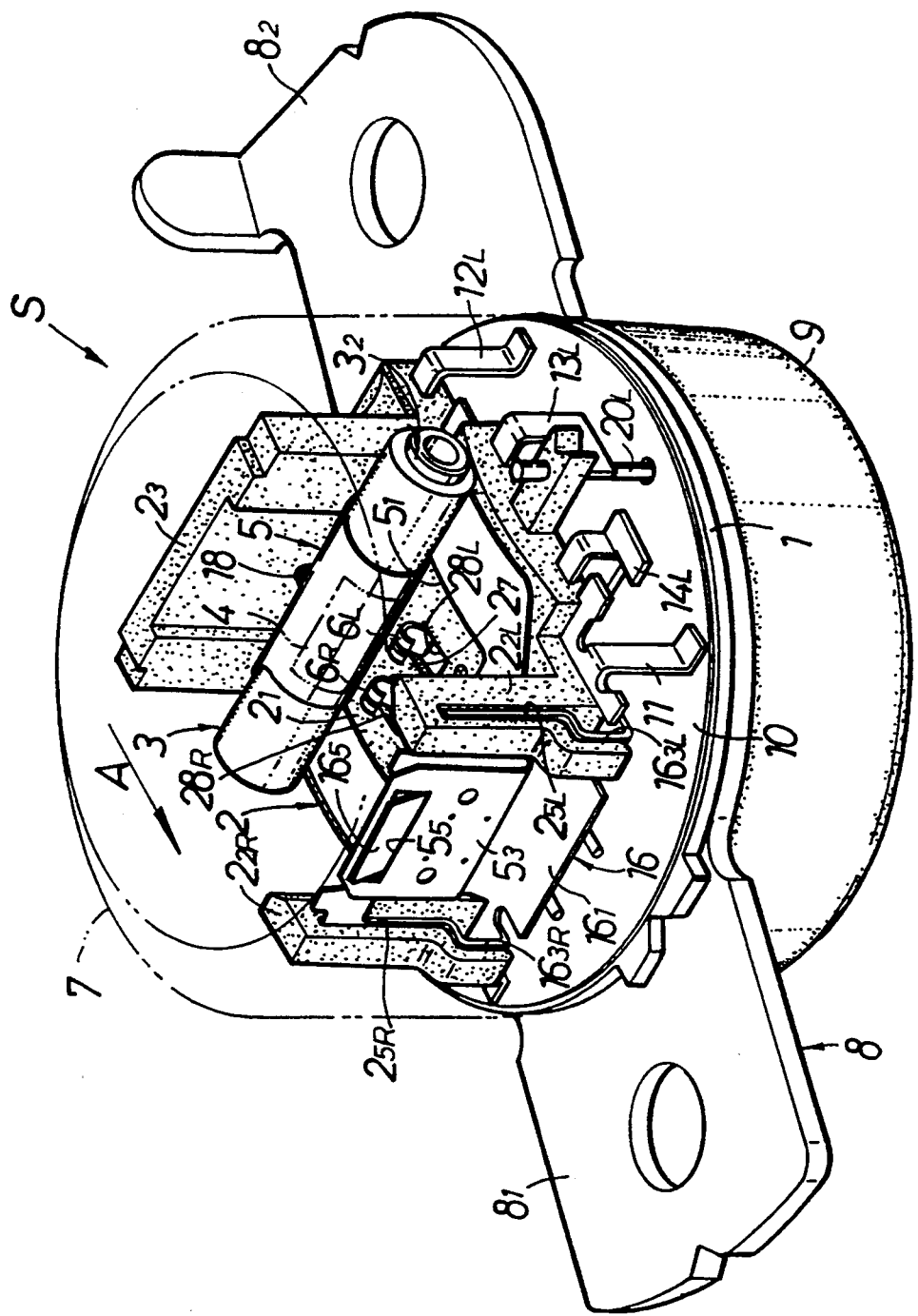

Referring to FIG. 1, an acceleration sensor S used as a cowl sensor includes a circular base plate 1 of metal, a resinous frame 2 supported on the circular base plate 1, a roller 3 disposed to roll on a guide surface $2_1$ formed on an upper surface of the resinous frame 2, a roll spring 5 wound around the roller 3 with a portion of the spring 5 forming a movable contact 4 (see FIG. 1), and a pair of left and right stationary contacts $6_L$ and $6_R$ provided on the frame 2 to lie in a path of rolling movement of the roller 3. The roller 3 is rolled in a direction of an arrow A against a biasing force of the roll spring 5 by a shock upon collision of a vehicle; thereby, closing the contacts $6_L$ and $6_R$.

Figure 2:
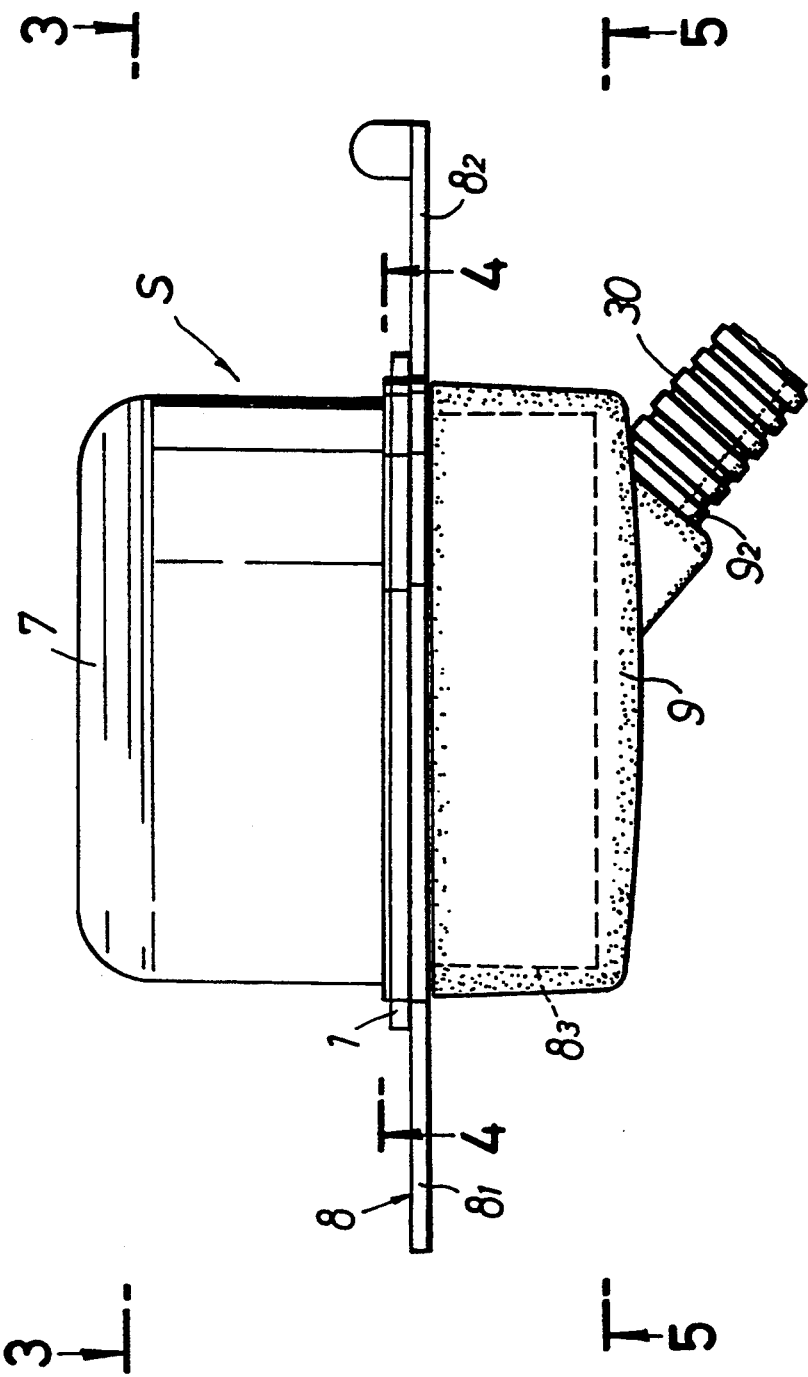

As shown in FIGS. 1 and 2, a metal casing 7 formed into a cup-like configuration is air-tightly welded to an outer periphery of the circular base plate 1 of the acceleration sensor S by a laser beam welding, and an inert gas is charged into the casing 7. A mounting bracket 8 having a pair of flange portions $8_1$ and $8_2$ for mounting the acceleration sensor S to a vehicle body is welded to a lower surface of the circular base plate 1. A columnar shaped potting partition $8_3$ is concentrically and integrally formed on a lower surface of the mounting bracket 8 (see, e.g., FIGS. 2 and 7). By forming the potting partition $8_3$ concentrically and integrally on the mounting bracket 8 for mounting the acceleration sensor S to the vehicle body in this manner, it is possible to simplify the structure and to reduce the number of parts or components. An opening in a lower surface of the partition $8_3$ is covered with a detachable cap 9 of resin.

Figure 3:
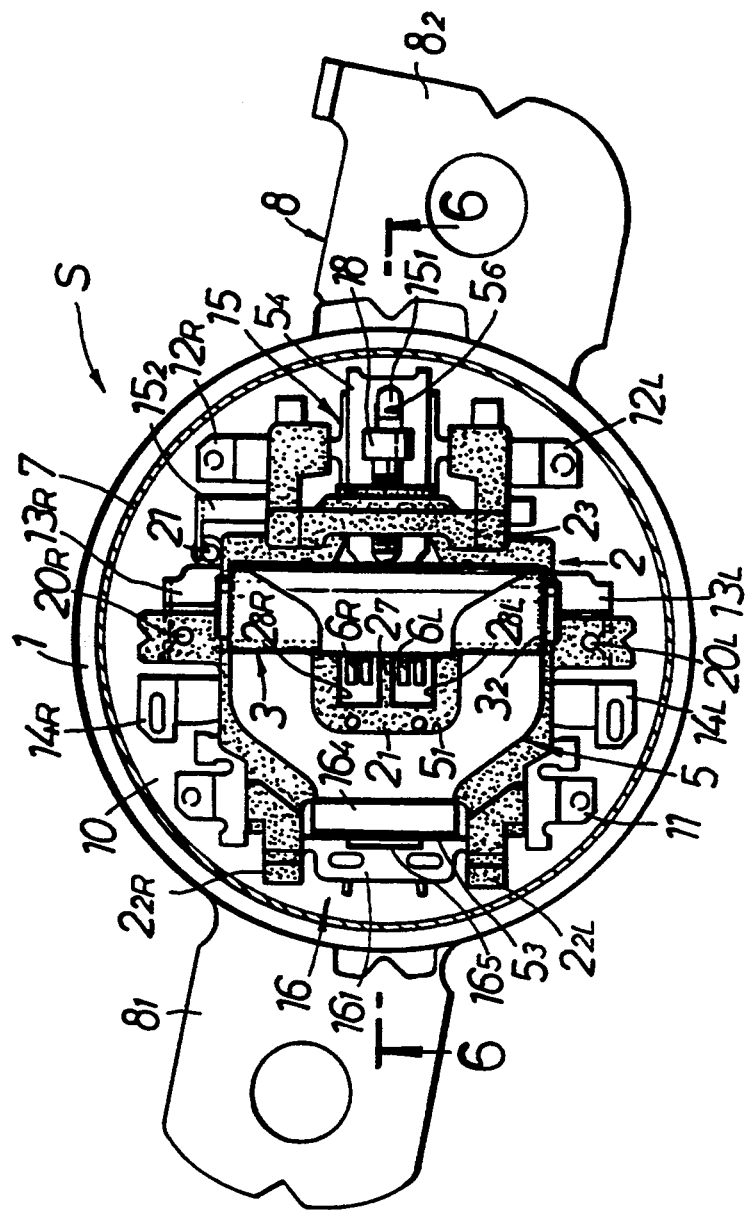
Figure 6:
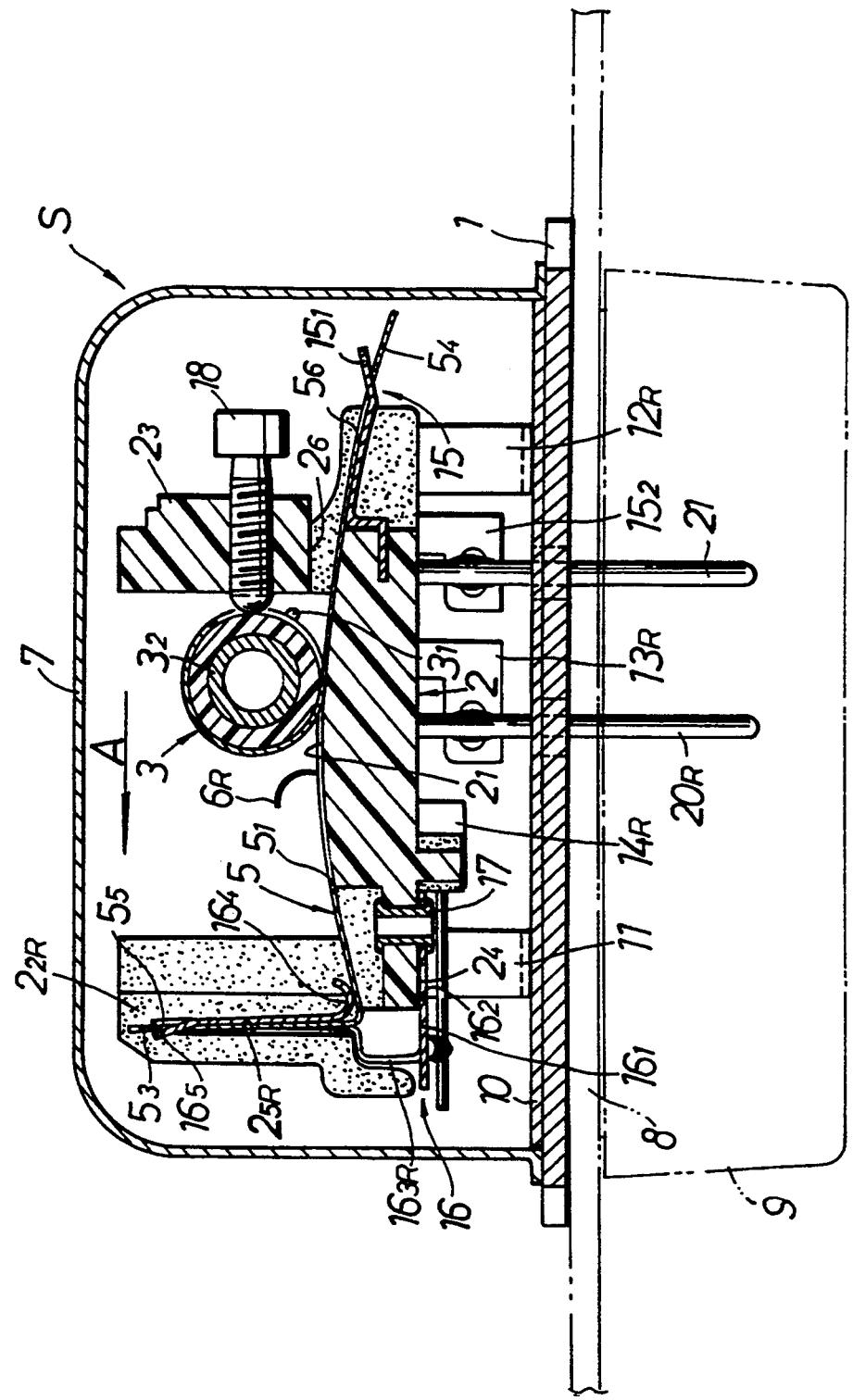

As can be seen from both of FIGS. 3 and 6, the resinous frame 2 is supported on a bottom plate 10 of metal superposed on an upper surface of the circular base plate 1 through a plurality of metal frames insert-molded integrally with the resinous frame 2. The metal frames included a substantially portal type front frame 11 located in the frontmost portion of the resinous frame 2 and spot-welded to the bottom plate 10, and a pair of left and right rear frames $12_L$ and $12_R$ located in the rearmost portion of the resinous frame and spot-welded to the bottom plate 10. The metal frames further include a pair of left and right stationary contact frames $13_L$ and $13_R$ located between the front frame 11 and the rear frames $12_L$ and $12_R$, a pair of left and right monitor resistor frames $14_L$ and $14_R$, and a spring-locking frame 15. The left and right stationary contact frames $13_L$ and $13_R$ are electrically insulated from each other, and the left and right monitor resistor frames $14_L$ and $14_R$ are also electrically insulated from each other. The left stationary contact frame $13_L$ and the left monitor resistor frame $14_L$ are electrically connected to each other within the resinous frame 2, and the right stationary contact frame $13_R$ and the right monitor resistor frame $14_R$ are also electrically connected to each other within the resinous frame 2. Further, the spring-locking frame 15 is electrically insulated from the left and right stationary contact frames $13_L$ and $13_R$ and the left and right monitor resistor frames $14_L$ and $14_R$.

A pair of left and right support walls $2_{2L}$ and $2_{2R}$ are risingly formed at a front end portion of the resinous frame 2, and a receiving wall $2_3$ is risingly formed at a rear end portion of the resinous frame 2. The guide surface $2_1$ is curved longitudinally in a convex manner over an area between the support walls $2_{2L}$ and $2_{2R}$ and the receiving wall $2_3$. The roll spring 5 is for biasing the roller 3 and is supported at longitudinally opposite ends thereof between the support walls $2_{2L}$ and $2_{2R}$ and the receiving wall $2_3$.

Figure 8:
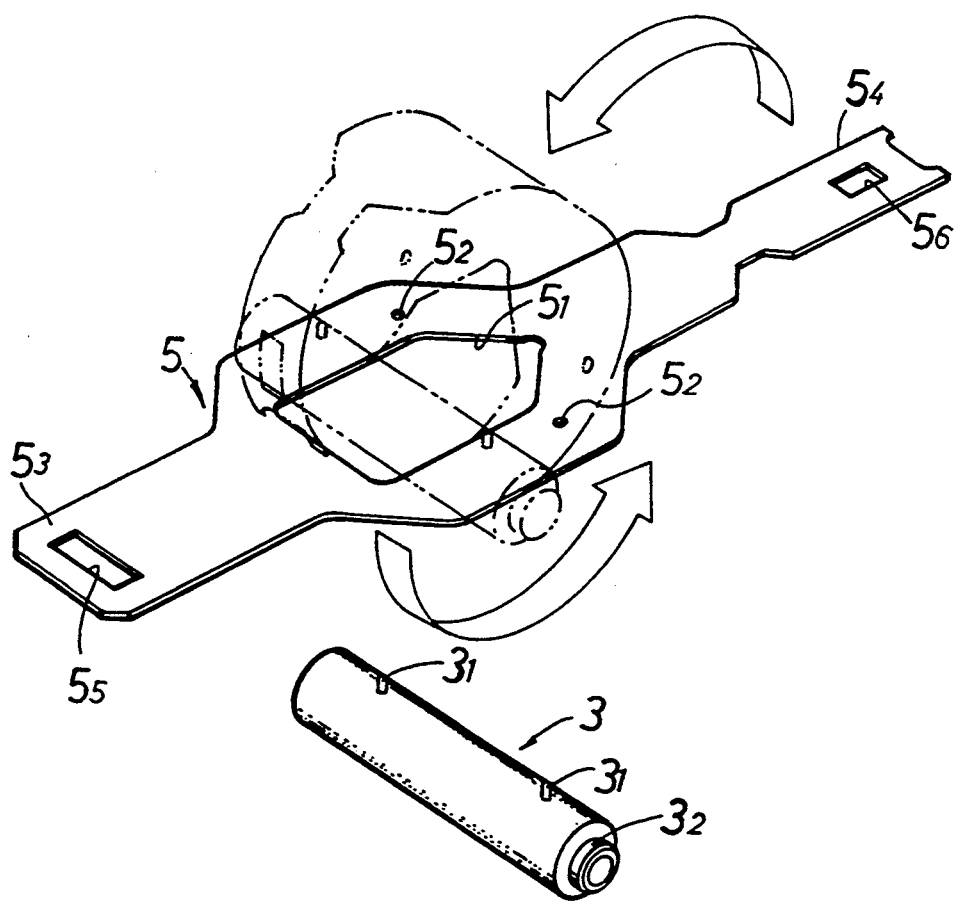

As can be seen from FIG. 8, the roll spring 5 is made of a material having an electric conductivity and a spring property. The spring 5 is provided at a central portion thereof with a window hole $5_1$ which is provided at opposite sides thereof with roller locking holes $5_2$. A front arm $5_3$ and a rear arm $5_4$ each having a smaller width are formed at front and rear ends of the roll spring 5. A temporarily locking hole $5_5$ is formed at a front end of the front arm $5_3$ and a locking hole $5_6$ is formed at a rear end of the rear arm $5_4$. The roller 3 is a member made of resin and is provided at an outer periphery thereof with two projections $3_1$ engaged with the roller locking holes $5_2$ in the roll spring 5, and a metal pipe $3_2$ is inserted as a core material into the roller 3.

Figure 4:
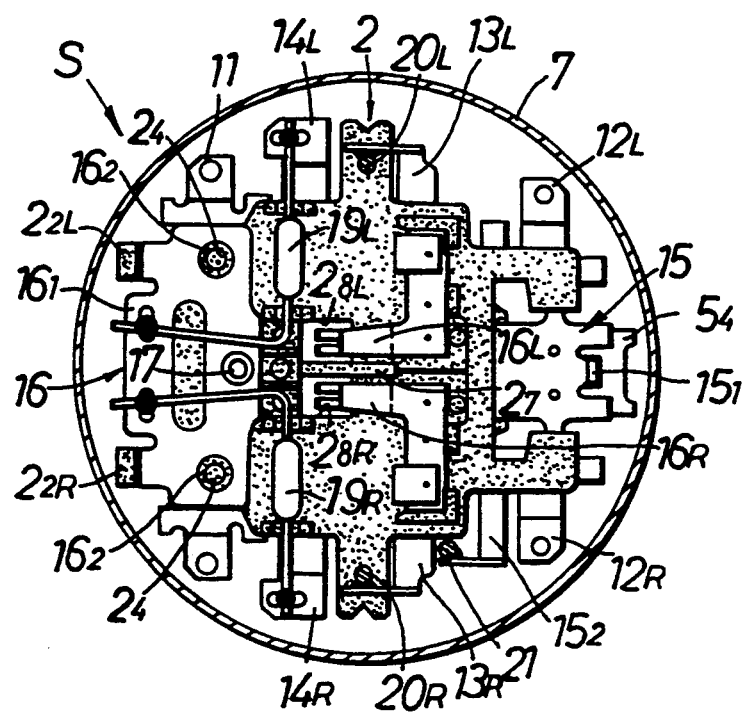

As can be seen from FIGS. 1, 4 and 6, a roll spring retaining member 16 having an L-shaped section and made of a metal plate having an electrical conductivity is secured to the front end of the resinous frame 2 by a clamping fixing portion 17, with a pair of positioning holes $16_2$ formed at a mounting portion $16_1$ of the member 16 and engaged with locating projections $2_4$ on the lower surface of the resinous frame 2. A pair of left and right support shaft portions $16_{3L}$ and $16_{3R}$ are connected to a front end of the mounting portion $16_1$ and are engaged from below and retained in slits $2_{5L}$ and $2_{5R}$ in the pair of left and right support walls $2_{2L}$ and $2_{2R}$ which stand at the front end of the resinous frame 2 (see FIGS. 1 and 6). Upper ends of the support shaft portions $16_{3L}$ and $16_{3R}$ are interconnected, and a face-like suspended portion $16_4$ is integrally formed to lie between the support shaft portions $16_{3L}$ and $16_{3R}$. A temporarily locking projection $16_5$ is cut out and raised at an upper end of the suspended portion $16_4$. A screw 18 serving as a roller stopper is threadedly inserted into the receiving wall $2_3$, and a through hole $2_6$, through which a rear leg $5_4$ of the roll spring 5 is passed, is formed in a lower end of the receiving wall $2_3$.

Since the left and right support shaft portions $16_{3L}$ and $16_{3R}$ of the roll spring retaining member 16 are engaged in the slits $2_{5L}$ and $2_{5R}$ formed in the support walls $2_{2L}$ and $2_{2R}$ of the resinous frame 2, as described above, it is possible to avoid a disadvantageous condition whereby the roll spring retaining member 16 comes into contact with an inner surface of the casing 7; i.e., a disadvantageous condition in that the movable contact 4 of the roll spring 5 is short-circuited to the casing 7, which results in a reduced reliability of the acceleration sensor S.

Referring to FIGS. 6 and 8, the method for assembling the roll spring 5 will be described below. First, the front arm $5_3$ is raised along a front surface of the suspended portion $16_4$ of the roll spring retaining member 16 from a lower end of the suspended portion $16_4$. Then, the temporarily locking hole $5_5$ formed in the front arm $5_3$ is locked to the temporarily locking projection $16_5$ formed at the upper end of the suspended portion $16_4$. Subsequently, the roll spring 5 is curved above the guide surface $2_1$ of the resinous frame 2, and the rear arm $5_4$ of the roll spring 5 is passed through the window hole $5_1$. The formed loop-like portion is wound around the roller 3, and the projections $3_1$ of the roller 3 are locked into the roller locking holes $5_2$ in the roll spring 5. Finally, the rear arm $5_4$ of the roll spring 5 is passed through the through hole $2_6$ formed in the lower end of the receiving wall $2_3$ and drawn out rearwardly, and the locking hole $5_6$ in the roll spring 5 is locked to a locking projection $15_1$ formed at the rear end of the spring locking frame 15.

The front arm $5_3$ of the roll spring 5 locked to the roll spring retaining member 16 is fixed to the suspended portion $16_4$ of the roll spring retaining member 16 by spot-welding. If the spot-welding is conducted with the front arm $5_3$ of the roll spring 5 temporarily locked to the roll spring retaining member 16 in this manner, the spot-welding operation can be carried out easily and accurately. By bringing the front arm $5_3$ of the roll spring 5 into abutment against the lower end of the suspended portion $16_4$ of the roll spring retaining member 16 and raising it upwardly, a tension is provided to the roll spring 5, and the roller 3 is biased rearwardly along the guide surface $2_1$ of the resinous frame 2 to abut against the screw 18 threadedly inserted in the receiving wall $2_3$.

As can be seen from FIGS. 3 and 4, the bases of the left and right stationary contacts $6_L$ and $6_R$ are fixed to the left and right stationary contact frames $13_L$ and $13_R$ by spot-welding, respectively. The tip ends of the left and right stationary contacts $6_L$ and $6_R$ project above the guide surface $2_1$ from a pair of recesses $2_{8L}$ and $2_{8R}$ formed through the resinous frame 2 on opposite sides of a partition $2_7$. A pair of monitor resistors $19_L$ and $19_R$ are connected at one end to the left and right resistor frames $14_L$ and $14_R$ electrically connected to the left and right stationary contact frames $13_L$ and $13_R$ for conduction therebetween, respectively, and at the other end to the common front frame 11.

Since the pair of stationary contacts $6_L$ and $6_R$ are mounted in the two recesses $2_{8L}$ and $2_{8R}$ formed in the resinous frame 2 on the opposite sides of the partition $2_7$, as described above, a short-circuiting between the stationary contacts $6_L$ and $6_R$ due to a dislocation of the stationary contacts $6_L$ and $6_R$ can be reliably prevented. In addition, since the roll spring 5 is supported on the partition $2_7$, not only a torsional deformation of the roll spring 5 can be prevented to enable a stable rolling of the roller 3, but also the strength of the resinous frame 2 can be increased by the partition $2_7$ serving as a reinforcing rib.

As shown in FIGS. 3, 4, and 6 a pair of left and right pins $20_L$ and $20_R$, which are embedded in a downwardly directed attitude in the resinous frame 2 and connected to outer ends of the stationary contact frames $13_L$ and $13_R$, are passed through the bottom plate 10 and the circular base plate 1 to extend to a position below the lower surface of the circular base plate 1. On the other hand, a pin 21 is connected to an outer end of the leg $15_2$ of the spring locking frame 15 and is likewise passed through the bottom plate 10 and the circular base plate 1 to extend to a position below the lower surface of the circular base plate 1. The pin 21 is electrically connected to the movable contact 4 of the roll spring 5 through the spring locking frame 15, and also is connected via the roll spring 5 and the front frame 11 to the other ends of the monitor resistors $19_L$ and $19_R$ which are connected to the front frame 11. The three pins $20_L$, $20_R$ and 21 project into the partition $8_3$ of the mounting bracket 8 where they are connected to lead wires extending outside the acceleration sensor S.

Figure 5:
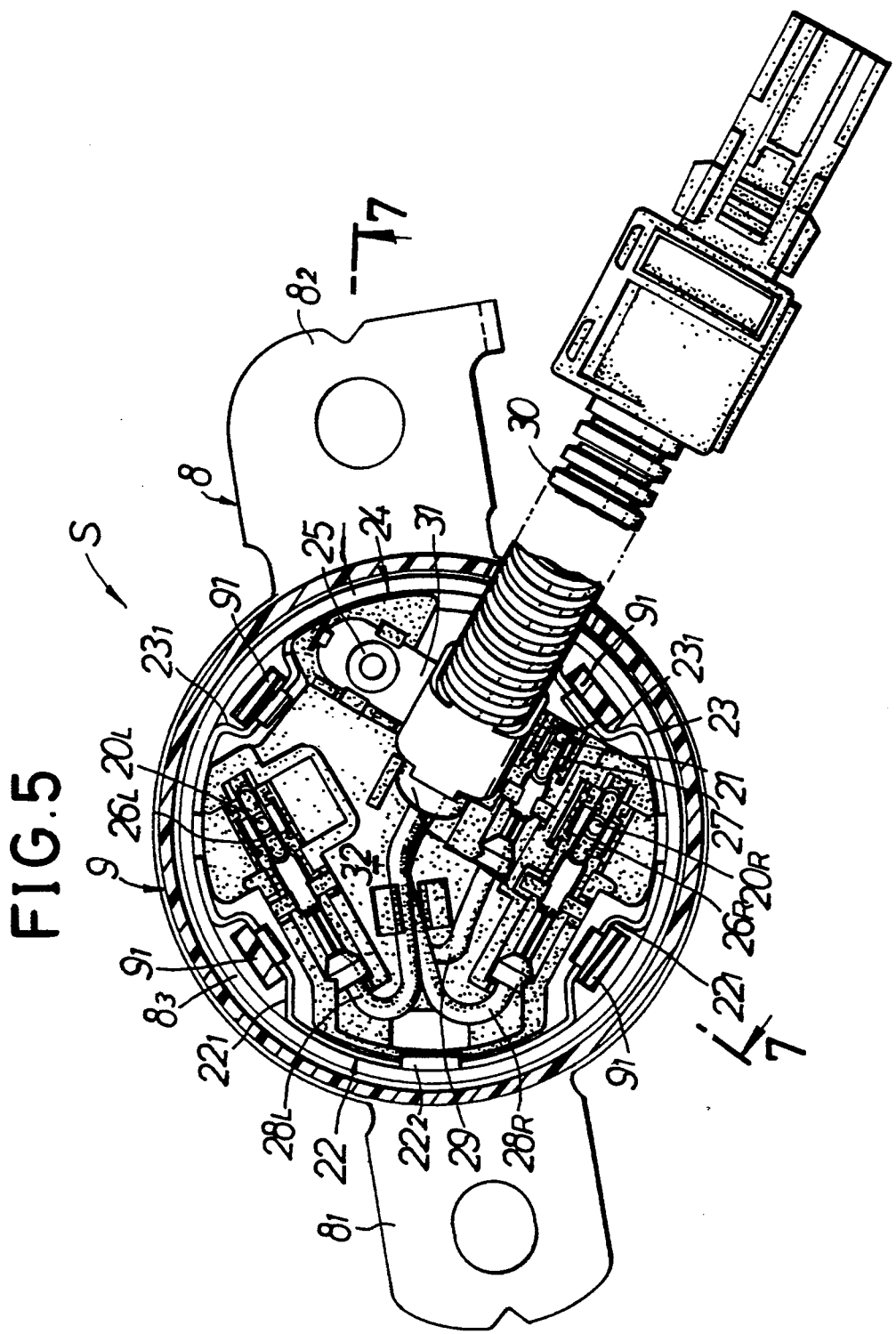
Figure 7:
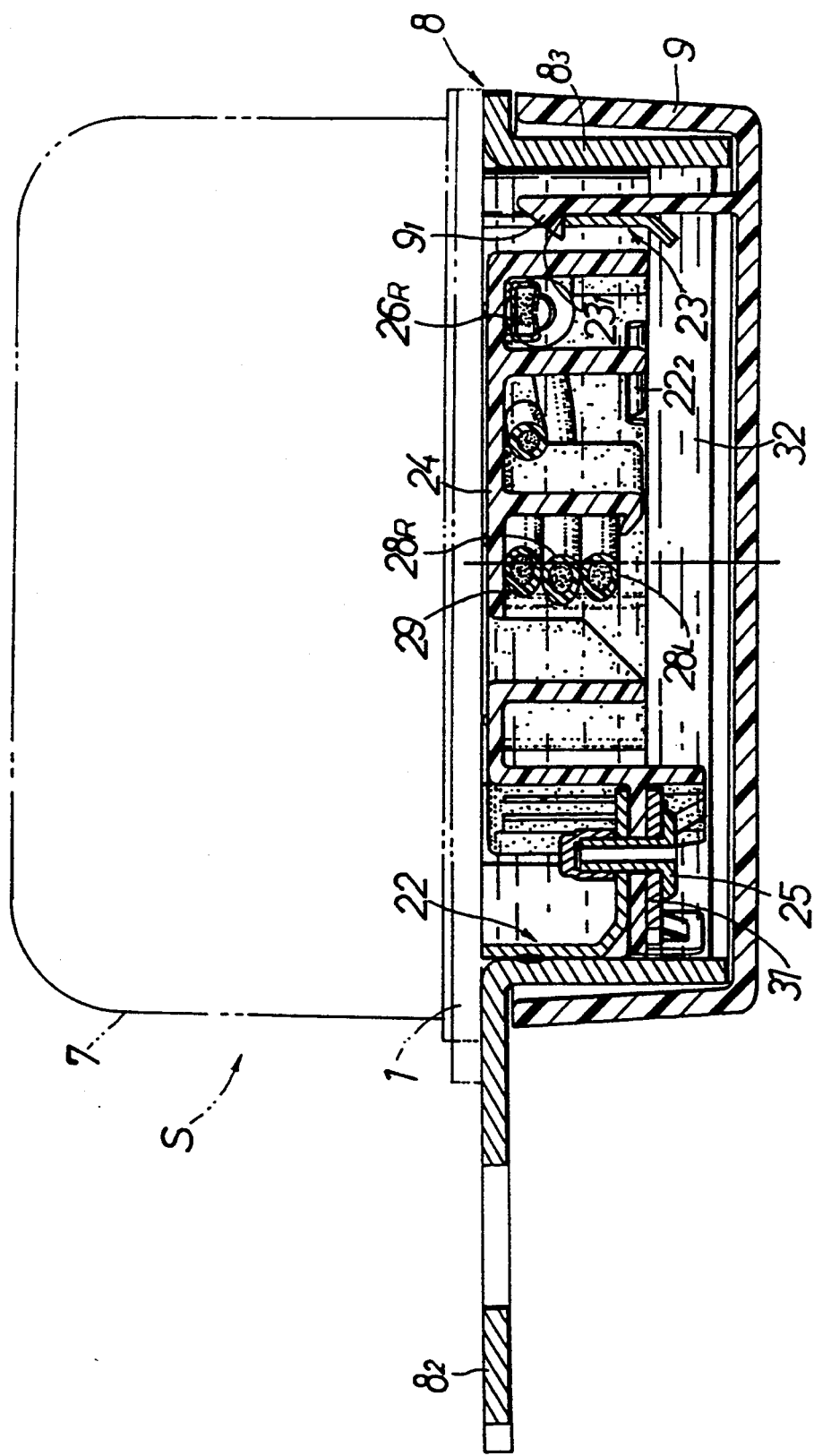

As shown in FIGS. 5 and 7, two arcuate mounting members 22 and 23 are welded to an inner surface of the partition $8_3$ of the mounting bracket 8. A terminal base plate 24 of resin, retained within the partition $8_3$, is locked at one end to a locking claw $22_2$ formed on one of the mounting members 22, and fixed at the other end to the other mounting member 23 by a rivet 25. Terminal base plate 24 is provided at its lower surface with terminals $26_L$ and $26_R$ of metal into which the two pins $20_L$ and $20_R$ are inserted, and with a terminal 27 into which the remaining pin 21 is inserted. Three lead wires $28_L$, $28_R$ and 29 are bundled into a harness and inserted through a flexible resinous tube 30. A harness holder 31 of metal for supporting a base end of the resinous tube 30 is placed on the terminal base plate 24 and clamped by the rivet 25 which fixes the terminal base plate 24 to the mounting member 23.

Four claw pieces $9_1$ are projectingly mounted within the cap 9 which covers the partition $8_3$ of the mounting bracket 8. The cap 9 is detachably fixed to the mounting bracket 8 by bringing the claw pieces $9_1$ into engagement with locking portions $22_1$ and $23_1$ formed on the mounting members 22 and 23. The resinous tube 30 with the three lead wires $28_L$, $28_R$ and 29 inserted therethrough is drawn out to the outside through an opening $9_2$ in the cap 9 (see FIG. 2).

The inside portion of the partition $8_3$ of the mounting bracket 8; i.e., a portion in which the terminal base plate 24 is accommodated, is potted by charging a soft silicone resin 32 thereinto. This potting is carried out by turning the acceleration sensor S into a vertically reverse attitude in a condition in which the cap 9 has been removed from the mounting bracket 8, and charging a liquid silicone resin 32 into the partition $8_3$ of the mounting bracket 8 and heating and curing the liquid silicone resin 32. In this case, the entire periphery of the mounting bracket 8 has been welded to the circular base plate 1 by a laser beam welding and therefore, any uncured silicone resin 32 cannot leak out through the bonded portion between the circular base plate 1 and the mounting bracket 8. Silicone resin leak results in the failure of finding a laser beam welding.

The structure can be simplified by forming the partition $8_3$ which constitutes a wall surface capable of retaining the potting silicone resin 32, integrally with the mounting bracket 8 for mounting the acceleration sensor S to the vehicle body. In addition, the potting which uses the silicone resin 32 which is kept gelled after being cured ensures not only the prevention of a crack and a gap from occurring in the silicone resin, but also accepts any deflections of the lead wires $28_L$, $28_R$ and 29 leading to an improved durability and an improved reliability of the lead wires $28_L$, $28_R$ and 29 against breakage. Moreover, since the opening in the partition $8_3$ of the mounting bracket 8 is covered with the cap 9 of resin, the potting portion of the silicone resin 32 can be protected by the cap; thereby, preventing deposition of dusts or the like.

Figure 9:
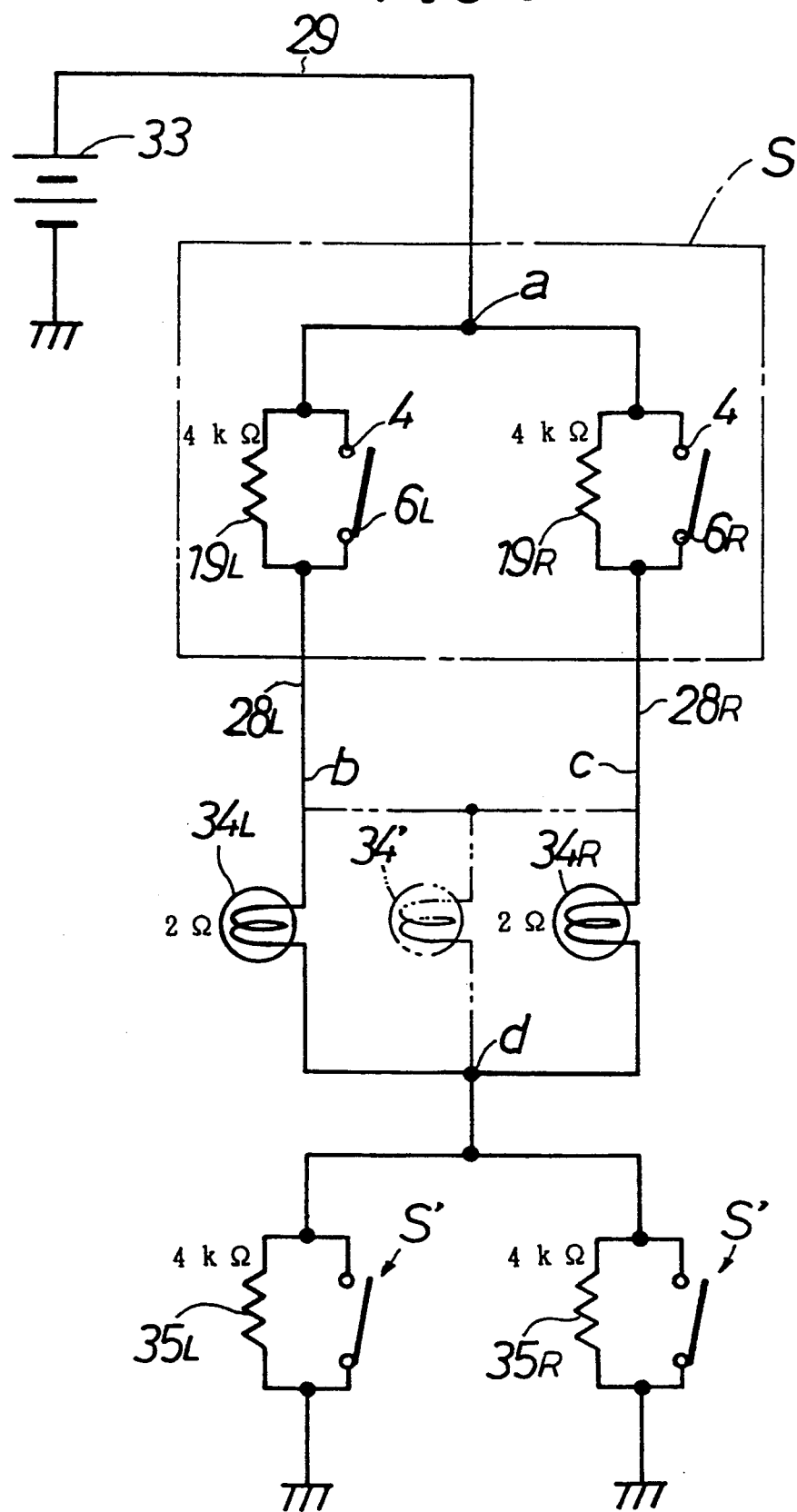

FIG. 9 illustrates an electric circuit for an air bag system for a vehicle. This electric circuit includes two acceleration sensors S' as main sensors, in addition to an acceleration sensors of the above-described type as cowl sensor.

A plus pole of a battery 33 of 12 volts is connected to the roll spring 5 and thus, to the movable contact 4 through the lead wire 29, and the pair of left and right stationary contacts $6_L$ and $6_R$ are opposed to the movable contact 4. Monitor resistors $19_L$ and $19_R$ of 4 k$\Omega$ are connected in parallel between the movable contact 4 and the pair of stationary contacts $6_L$ and $6_R$, respectively. The left stationary contact $6_L$ is connected to a squib $34_L$ for operating an air bag system, for example, for an assistant driver's seat through the lead wire $28_L$, and the right stationary contact $6_R$ is connected to a squib $34_R$ of an air bag system, for example, for a driver's seat through the lead wire $28_R$. The squibs $34_L$ and $34_R$ are each adapted to ignite or fire a propellant for the associated air bag system by energization and have a resistance value (2 $\Omega$) far smaller than those of the monitor resistors $19_L$ and $19_R$.

Lead wires of the squibs $34_L$ and $34_R$ are interconnected at the side opposite to the acceleration sensor S, and bifurcated therefrom and connected to the two acceleration sensors S'. Monitor resistors $35_L$ and $35_R$ of 4 k$\Omega$ are connected in parallel to contacts of the acceleration sensor S'.

The operation of the embodiment of the present invention having the above-described structural arrangement will be described below.

In a usual condition, the roller 3 of the acceleration sensor S is in a state as shown in the drawings. The roller 3 is in abutment against the screw 18 under the action of the biasing force of roll spring 5, and the roll spring 5 constituting the movable contact 4 (see FIG. 1) is spaced from the pair of stationary contacts $6_L$ and $6_R$. If the roller 3 is rolled in the direction of the arrow A against the biasing force of the roll spring 5 by a shock due to the collision of the vehicle, the movable contact 4 simultaneously conducts electric current to the pair of stationary contacts $6_L$ and $6_R$. At this time, the acceleration sensors S', as the pair of main sensors, also electrically conduct due to the shock as shown in FIG. 9. Therefore, an electric current flows from the battery 33 through the lead wire 29, the movable contact 4, the stationary contact $6_L$, the lead wire $28_L$ and the squib $34_L$ to the pair of acceleration sensors S', and through the lead wire 29, the movable contact 4, the stationary contact $6_R$, the lead wire $28_R$ and the squib $34_R$ to the pair of acceleration sensors S'. Thus, the air bag system for the assistant driver's seat is expanded and developed by the squib $34_L$, while the air bag system for the driver's seat is expanded and developed by the squib $34_R$.

The two monitor resistors $19_L$ and $19_R$ each having 4 k$\Omega$ resistance in the acceleration sensor s are connected in parallel, and the two monitor resistors $35_L$ and $35_R$ each having 4 k$\Omega$ resistance in the acceleration sensor S' are connected in parallel. Therefore, in a normal condition, an electric potential at a point a in FIG. 9 is 12 volts, and electric potentials at points b, c and d are 6 volts. However, for example, if the squibs $34_L$ and $34_R$ are broken, or if the movable contact 4 and the stationary contacts $6_L$ and $6_R$ in the acceleration sensor S are short-circuited, the electric potentials at the points a, b, c and d are changed from the normal condition and therefore, the function thereof can be confirmed by monitoring such electric potentials by a diagnosis unit.

When the acceleration sensor S is exclusively used for, e.g., a driver's seat, a single squib 34' may be wired as shown by dashed lines in FIG. 9. In this case, two sets of contacts; i.e., a set of the movable contact 4 and the stationary contact $6_L$ and a set of the movable contact 4 and the stationary contact $6_R$ perform the same action, and the squib 34' can be operated to expand and develop the air bag system.

When the acceleration sensor S is exclusively used for, e.g., a driver's seat as described above, an electric potential at the point a connected to the battery 33 is 12 volts, and because of the two monitor resistors $19_L$ and $19_R$ being connected in parallel, electric potentials at the points b, c and d are 6 volts, which is the same as the case where the acceleration sensor S is used for both the driver's seat and the assistant driver's seat. This indicates that a common monitoring diagnosis unit can be used for both of the cases where the same acceleration sensor s is used for both the driver's seat and the assistant driver's seat and the case where the same acceleration sensor S is used exclusively for the driver's seat. This substantially enhances the flexibility of the acceleration sensor S.

Although the embodiment of the present invention has been described in detail, it will be understood that the present invention is not limited to the above-described embodiment, and various minor modifications and variations in design can be made without departing from the scope of the invention described in claims.

For example, the acceleration sensor is not limited to the use for the air bag system, and can be also used for a seat belt retracting system. The shape and number of the flanges $8_1$ and $8_2$ of the mounting bracket 8 are not limited to those in the embodiment and can be changed properly. Further, in place of soft silicone resin 32 as a potting agent, another material such as a hard epoxy resin or the like can be used.

The above description is included to illustrate the structural arrangement and the operation of the preferred embodiments, and is not meant to limit the scope of this invention. The scope of this invention is to be limited only by the following claims. From the above discussion, many variations are apparent to one skilled in the art which would yet be encompassed by the spirit and scope of this invention.

What is claimed is:

1. An acceleration sensor for a vehicle, comprising:
a resinous frame;
a roller capable of rolling along a guide surface of said resinous frame;
a roll spring wound around said roller, said roll spring having opposite ends in a direction of rolling movement said roller fixed to said resinous frame, said roll spring further having two arm portions distanced laterally from each other and a single movable contact forming portion for forming a movable contact, said arm portions being connected commonly at one end thereof to said movable contact forming portion; and
stationary contacts mounted on said resinous frame to lie in a path of rolling movement of said roller and disposed at locations inwardly of said two arm portions of the roll spring,
wherein said roller is rolled against a biasing force of said roll spring by an inertia due to a shock to thereby cause said stationary contacts to be electrically connected with said movable contact,
wherein said movable contact forming portion has a width capable of coming into contact with the stationary contacts simultaneously, and
wherein the guide surface of said resinous frame is provided with two recesses divided by a partition, and said stationary contacts are disposed in said recesses, respectively, so as to be distanced from each other by said partition and from said movable contact and said two arm portions on the guide surface with spacings therebetween.

2. An acceleration sensor for a vehicle according to claim 1, wherein means are provided between said roller and said roll spring for preventing relative displacement therebetween in the direction of rolling movement.

3. An acceleration sensor for a vehicle according to claim 2, wherein said means comprise a projection provided on one of the roller and the roll spring and a hole provided on the other of the roller and the roll spring, said projection being engaged in said hole upon assembly.

4. An acceleration sensor for a vehicle, comprising:
a resinous frame;
a roller capable of rolling along a guide surface of said resinous frame;
a roll spring wound around said roller to form a movable contact; and
stationary contacts mounted on said resinous frame to lie in a path of rolling movement of said roller,
wherein said roller is rolled against a biasing force of said roll spring by an inertia due to a shock to thereby cause said stationary contacts to be electrically connected with said movable contact,
wherein said sensor further includes an electrically conductive roll spring retaining member which stands at an edge of said resinous frame so as to retain one end of the roll spring, and an electrically conductive casing which covers an upper portion of said resinous frame, said roll spring retaining member being supported by a support wall integrally rising from said resinous frame, at least a portion of said support wall being interposed between said roll spring retaining member and said casing.

5. An acceleration sensor for a vehicle, comprising:
a sensor body;
a resinous frame;
a roller capable of rolling along a guide surface of said resinous frame;
a roll spring wound around said roller to form a movable contact; and
stationary contacts mounted on said resinous frame to lie in a path of rolling movement of said roller,
wherein said roller is rolled against a biasing force of said roll spring by an inertia due to a shock to thereby cause said stationary contacts to be electrically connected with said movable contact,
wherein said sensor further includes a flange portion for fixing said sensor body to a mounting portion, and an annular partition formed integrally with said flange portion, a potting agent being filled into an inside portion of said partition to seal a base portion of a harness of lead wires which extend from said sensor body to an outside thereof.

6. An acceleration sensor for a vehicle according to claim 5, wherein said sensor further comprises a cap detachably covering an opening in said partition, and a harness holder for supporting said harness of lead wires, said cap and said harness holder being mounted on a mounting member fixed inside the portion and wherein said potting agent is flexible.

* * * * *